(12) United States Patent
Hui et al.

(10) Patent No.: US 9,344,694 B2
(45) Date of Patent: May 17, 2016

(54) SPATIAL LIGHT MODULATOR SUB-PIXEL ARCHITECTURE AND METHOD

(75) Inventors: Sue Hui, Plano, TX (US); Cuiling (Sue) Gong, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 1084 days.

(21) Appl. No.: 12/198,671

(22) Filed: Aug. 26, 2008

(65) Prior Publication Data
US 2010/0053477 A1   Mar. 4, 2010

(51) Int. Cl.
*G09G 3/34* (2006.01)
*H04N 9/31* (2006.01)

(52) U.S. Cl.
CPC .................... *H04N 9/3123* (2013.01)

(58) Field of Classification Search
CPC ............. H04N 9/3105; H04N 9/3123; G09G 2310/061; G02B 26/0841
USPC ....................... 345/84, 85, 204, 205; 348/750, 348/755–758; 359/237–324
See application file for complete search history.

(56) References Cited

U.S. PATENT DOCUMENTS

| | | | |
|---|---|---|---|
| 5,096,279 A | 3/1992 | Hornbeck et al. | |
| 5,614,921 A | 3/1997 | Conner et al. | |
| 5,706,123 A | 1/1998 | Miller et al. | |
| 5,729,245 A * | 3/1998 | Gove et al. | 345/84 |
| 5,745,088 A * | 4/1998 | Kornher | G09G 3/34 345/100 |
| 5,969,710 A * | 10/1999 | Doherty et al. | 345/693 |
| 6,201,521 B1 | 3/2001 | Doherty | |
| 6,970,150 B2 | 11/2005 | Hewlett et al. | |
| 7,075,701 B2 | 7/2006 | Novotny et al. | |
| 7,113,159 B2 * | 9/2006 | Sawabe | 345/89 |
| 7,301,688 B2 * | 11/2007 | Shreeve et al. | 359/290 |
| 7,355,779 B2 | 4/2008 | Mignard et al. | |
| 7,379,080 B2 * | 5/2008 | Asao et al. | 345/690 |
| 7,388,697 B2 | 6/2008 | Chui et al. | |
| 7,471,442 B2 * | 12/2008 | Sampsell | 359/290 |
| 2002/0012159 A1 | 1/2002 | Tew | |
| 2005/0184938 A1 | 8/2005 | Hewlett et al. | |
| 2006/0050066 A1 | 3/2006 | Hewlett et al. | |
| 2007/0279344 A1 * | 12/2007 | Kimura et al. | 345/77 |

\* cited by examiner

*Primary Examiner* — Amr Awad
*Assistant Examiner* — Aaron Midkiff
(74) *Attorney, Agent, or Firm* — Michael A. Davis, Jr.; Frank D. Cimino

(57) ABSTRACT

A semiconductor device comprises an array of individually controllable image pixels arranged in a plurality of reset groups. Each of the image pixels in the array of individually controllable image pixels has a one-to-one correspondence with at least one memory cell in an array of memory cells. The semiconductor device further comprises a plurality of sub-pixel sets, wherein each sub-pixel in the plurality of sub-pixel sets is a micromirror, and wherein each of the image pixels comprises a sub-pixel set.

8 Claims, 11 Drawing Sheets

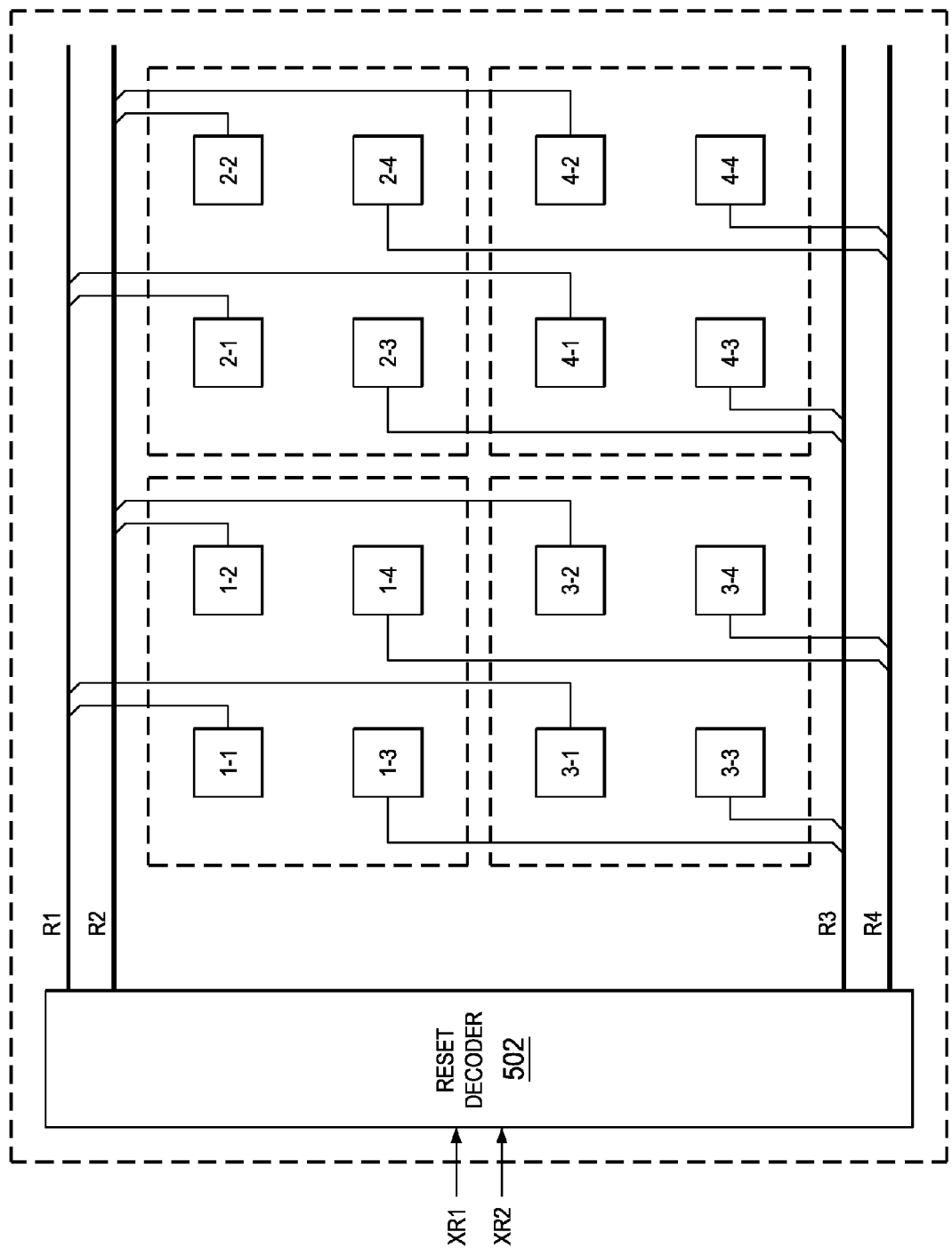

SPATIAL LIGHT MODULATOR SUB-PIXEL ARCHITECTURE AND METHOD

TECHNICAL FIELD

A preferred embodiment relates generally to spatial light modulator image display systems and methods using a digital micromirror device (DMD), and more particularly to sub-pixel spatial light modulators structures and to methods.

BACKGROUND

Spatial light modulators (SLMs) are in wide use in display systems in part due to having the benefit of high resolution while consuming lower power and having less bulk than conventional Cathode Ray Tube (CRT) technology. One type of SLM display is the digital micromirror device(DMD). Some projection display systems use microdisplays, such as DMDs or deformable micromirrors, to generate an image on a display plane. In general, a microdisplay in a projection display system is used to create a miniature version of the image to be displayed, and optical lenses and elements are used to project an enlarged version of the image on the display plane. DMDs are used in Texas Instrument DLP® technology as optical switches or transmitters for television (TV) and projection systems. DMDs are optical semiconductor devices having an array of thousands or up to millions of micromirrors that are switched on or off at varying frequencies, forming a digital image. Some systems may have a single DMD, whereas other systems may include three DMDs, as examples. Systems that utilize DMDs have a high fidelity and improved picture quality.

Each micromechanical display element, in a DMD array, has a mirror that is individually addressable by an electronic signal. Depending on the state of its addressing signal, each mirror tilts so that it either does or does not reflect light to the image plane. The mirrors may be generally referred to as display elements, which correspond to the pixels of the image that they generate, in this known structure. Generally, displaying pixel data is accomplished by loading memory cells connected to the display elements. The display elements maintain their ON or OFF state for controlled display times.

Intermediate levels of illumination, that is levels between white (ON) and black (OFF), may be achieved, by pulse-width modulation (PWM) techniques, in one known method. The basic PWM scheme involves first determining the rate at which images are to be presented to the viewer. This establishes a frame rate and a corresponding frame period. For example, in a standard television system, images are transmitted at 30 frames per second, and each frame lasts for approximately 33.3 milliseconds.

In a simple example, assuming n bits of resolution, the frame time is divided into $2^n-1$ equal time slices. Upon establishing these times for each pixel of each frame, pixel intensities may be quantized, such that black is zero time slices, the intensity level represented by the least significant bit (LSB) is one time slice, and maximum brightness is $2^n-1$ time slices, where n is the bit resolution. Each pixel's quantized intensity determines its ON-time during a frame period. Thus, during a frame period, each pixel, with a quantized value of more than zero, is ON for the number of time slices that corresponds to the pixel's intensity. The viewer's eye integrates the pixel brightness so that the image appears the same as if it were generated with analog levels of light.

To address DMDs, PWM calls for the data to be formatted into bit-planes, each bit-plane corresponding to a bit weight of the intensity value. A bit plane of a digital discrete signal (e.g., of an image) is a set of bits having the same position in the respective binary numbers. For example, for 8-bit data representation, there are 8 bit-planes, wherein the first bit-plane contains the set of the MSBs and the $8^{th}$ bit-plane contains the set of the LSBs. The MSB bit-plane generally gives the roughest but most critical approximation of pixel values of an image, and the less significant bit plane, the less is its contribution to the image value approximation. Thus, adding a bit-plane generally gives a better approximation of the image. Each bit-plane from the LSB to the MSB has twice the bit weight of the previous bit-plane.

Thus, if each pixel's intensity is represented by an n bit value, each frame of data has n bit-planes. Each bit-plane has a 0 or 1 value for each display element. Each bit-plane may be separately loaded and the display elements may be activated according to their associated bit-plane values. For example, the bit-plane representing the LSBs of each pixel is displayed for one time slice, whereas the bit-plane representing the most significant bit (MSB) is displayed for $2^n/2$ time slices.

Turning to FIG. 1A for a simplified version of this concept, a prior art DMD mirror 102 is shown with a corresponding graph of light intensity versus time in FIG. 1B. For this illustration, the intensity resolution n=2 is used, therefore an integrated time period $t_p$, $2^n-1$ is equal to three time slices. Therefore each of the frames represented by time period, $t_1$, $t_2$, and $t_3$, is subdivided into three time slices a, b, and c. The MSB occupies time slices a and b, while the LSB occupies time slice c. In time period $t_1$, the bit value is 00, therefore zero time slices are illuminated for time period $t_1$, and to the eye, time period $t_1$ is dark. In time period $t_2$, the bit value is 11, so the mirror is illuminated for three out of three time slices, and to the eye, time period $t_2$ is at a maximum or 100% bright. In time period $t_3$, the bit value is 01, so the mirror is dark for two time slices and then illuminated for one time slice, for time period $t_3$, therefore, the eye perceives time period $t_3$ as 33% as bright as time period $t_2$.

In this simplified prior art example there are no illuminated integrated times that are less than 33% bright. In application, however, DMD devices typically control brightness with more than two bits resolution, thus there are many more time slices per frame. However, even in known more complex DMD devices the lowest intensity displayable is governed by the duration of a time slice. In other words, depth of intensity is controlled by timing.

Although the DMD display bit depth is adequate for some applications, an enhanced display bit depth is desired. What is needed then is a new structure and method of providing a lower illumination display bit depth.

SUMMARY OF THE INVENTION

This problem is generally solved or circumvented, and technical advantages are generally achieved, by an SLM sub-pixel apparatus, an SLM display system incorporating an SLM sub-pixel apparatus, and methods of operating SLM sub-pixels.

In accordance with an illustrative embodiment, a semiconductor device comprises an array of individually controllable image pixels arranged in a plurality of reset groups. Each of the image pixels in the array of individually controllable image pixels has a one-to-one correspondence with an at least one memory cell in an array of memory cells. The semiconductor device further comprises a plurality of sub-pixel sets, wherein each sub-pixel, in the plurality of sub-pixel sets, is a micromirror, and wherein each of the image pixels are comprised of a sub-pixel set.

In another aspect of the illustrative embodiments, a method for controlling a micromirror array is presented. The method includes loading each sub-pixel, in a plurality of sub-pixels within each image pixel, simultaneously from a same data line. The method also includes resetting each sub-pixel, in the plurality of sub-pixels within each image pixel, independently, forming a fractional pixel bit.

Advantages of preferred embodiments include providing a display system with lower intensity levels and an expanded display bit depth.

The foregoing has outlined rather broadly the features and technical advantages of an illustrative embodiment in order that the detailed description of the invention that follows may be better understood. Additional features and advantages of an illustrative embodiment will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the illustrative embodiments as set forth in the appended claims.

BRIEF DESCRIPTION OF THE DRAWINGS

For a more complete understanding of the illustrative embodiments, and the advantages thereof, reference is now made to the following descriptions taken in conjunction with the accompanying drawings, in which:

FIG. 5 shows a plan view of a DMD sub-pixel structure including a reset decoder;

Corresponding numerals and symbols in the different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the illustrative embodiments provide many applicable inventive concepts that can be embodied in a wide variety of specific contexts. The specific embodiments discussed are merely illustrative of specific ways to make and use the invention, and do not limit the scope of the invention.

The present invention will be described with respect to illustrative embodiments in a specific context, namely a DMD structure having four sub-pixels. The invention may also be applied, however, to other DMD structures comprising a different number of sub-pixels, such as 2, 3, 5, 6, etc. This invention also may be applied to other SLMs, such as liquid crystal displays.

Comprehensive descriptions of DMD-based digital display systems are set out in U.S. Pat. No. 5,079,544, entitled "Standard Independent Digitized Video System," in U.S. patent application Ser. No. 08/147,249, entitled "Digital Television System," and in U.S. patent application Ser. No. 08/146,385, entitled "DMD Display System." PWM methods are set out in U.S. Pat. No. 5,278,652, entitled "DMD Architecture and Timing for Use in a Pulse Width Modulated Display System." Timing constraints and organization are set forth in U.S. Patent Publication No. 2005/0184938, entitled "Bit Segment Timing Organization Providing Flexible Bit Segment Lengths." Divided reset groups are set out in U.S. Pat. No. 6,201,521, entitled "Divided Reset for Addressing Spatial Light Modulator." Each of these patents and patent applications is assigned to Texas Instruments Incorporated, and each is incorporated herein by reference.

In analog to digital converters, such as those used in a DLP® display system, performance can be improved using dither. Dither is a small amount of random noise that is intentionally added to the analog input before conversion. Dither amplitude is set to be about half of the LSB. The effect of dithering is to cause the state of the LSB to randomly oscillate between 0 and 1 in the presence of very low levels of input, rather than sticking at a fixed value. Thus, dithering extends the effective range of signals that the analog to digital converter can convert, at the expense of an increase in noise. Therefore, since an embodiment provides a display system with lower intensity levels and an expanded display bit depth, a further advantage of an embodiment is to allow lower dithering noises to be used in display systems.

Figure 2:
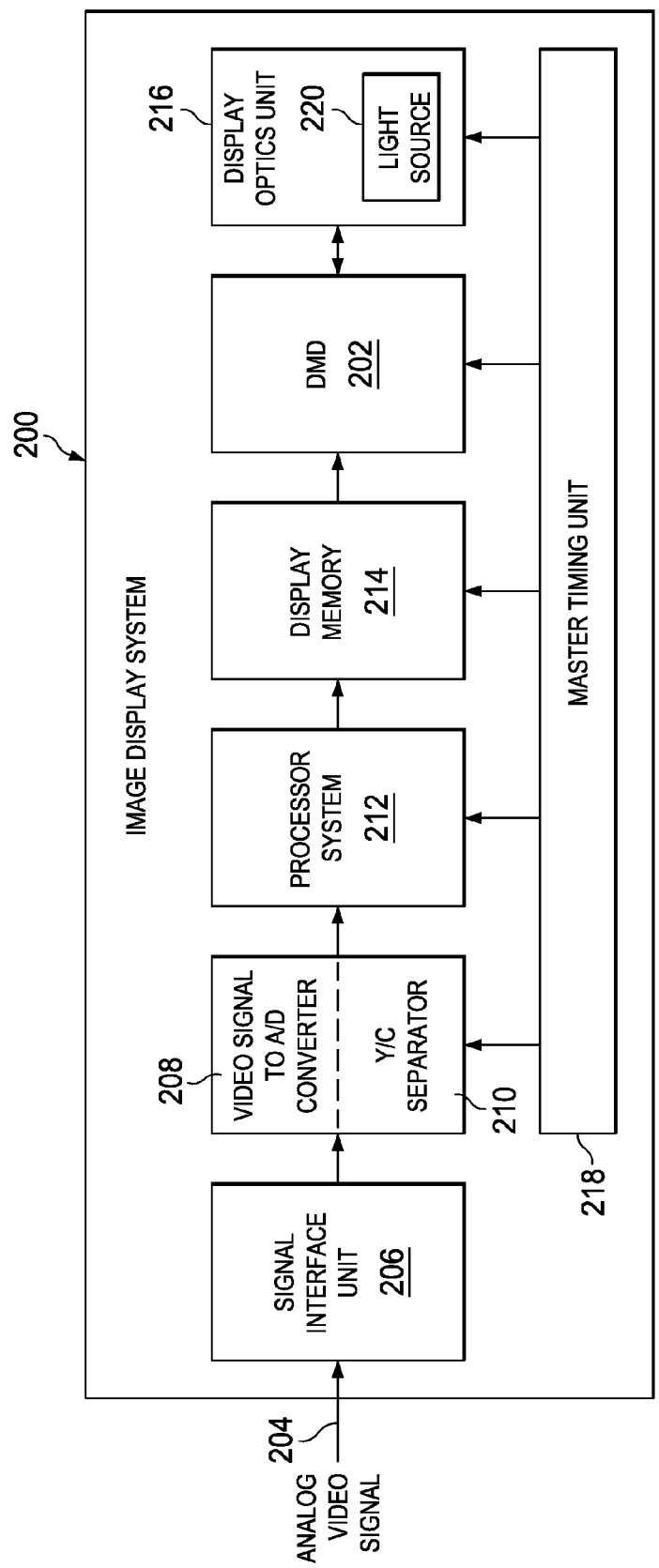
FIG. 2 is a block diagram of an image display system, in accordance with an illustrative embodiment.

FIG. 2 is a block diagram of an image display system 200, in accordance with an illustrative embodiment. Image display system 200 uses DMD 202 to generate real-time images from an analog video signal 204, such as a broadcast television signal. In another embodiment, the input signal may already represent digital data. In FIG. 2, only those components significant to main-screen pixel data processing are shown. Other components, such as might be used for processing synchronization and audio signals or secondary screen features, such as closed captioning, are not shown.

Signal interface unit 206 receives an analog video signal 204 and separates video, synchronization, and audio signals. Signal interface unit 206 delivers the video signal to A/D converter 208 and Y/C separator 210, which convert the data into pixel-data samples and which separate the luminance ("Y") data from the chrominance ("C") data, respectively. The signal is converted to digital data before Y/C separation in this embodiment, but in other embodiments, Y/C separation could be performed before A/D conversion.

Processor system 212 prepares the data for display by performing various pixel data processing tasks. Processor system 212 may include processing memory useful for such tasks, such as field and line buffers. The tasks performed by processor system 212 may include linearization (to compensate for gamma correction), colorspace conversion, and interlace to progressive scan conversion. The order in which these tasks are performed may vary.

Display memory 214 stores processed pixel data from processor system 212. Processor system 212 formats the data, on input or on output, into "bit-plane" format, and delivers the bitplanes to DMD 202 one at a time. As discussed in the Background, the bit-plane format permits each display element of DMD 202 to be turned ON or OFF in response to the value of 1 bit of data at a time. In this example, the formatting is performed by hardware associated with display memory 214. However, in other embodiments, the formatting could be performed by processor system 212 or by dedicated formatting hardware in the data path before or after display memory 214.

In image display system 200, display memory 214 is a "double buffer" memory, which means that it has a capacity for at least two display frames. The buffer for one display frame can be read out to DMD 202 while another display frame is being written to the other buffer. The two buffers are controlled using rapid switching so that data is continuously available to DMD 202.

Essentially, DMD 202 uses the data from display memory 214 to address each display element of its display element array. The "ON" or "OFF" state of each display element forms an image. In an embodiment of this invention, each display element (or image pixel) of DMD 202 has an associated memory cell. The embodiments explained herein are directed to a DMD configured for divided reset. In a divided reset configuration, a DMD is divided into reset groups connected to different reset lines, so that one reset group can be loaded and its display time begun while the next reset group is loaded. Short bit-planes are possible because the display time need not include the time to load the entire array, and, for any reset group, its reset can be delayed while other reset groups are loaded.

Display optics unit 216 has optical components for receiving the image from DMD 202 and light source 220 for illuminating an image plane such as a display screen. For color displays, the display optics unit 216 could include a color wheel, and bit-planes for each color could be sequenced and synchronized to the color wheel. Or, the data for different colors could be concurrently displayed by multiple DMDs and combined by display optics unit 216. Master timing unit 218 provides various system control functions.

Figure 1A:
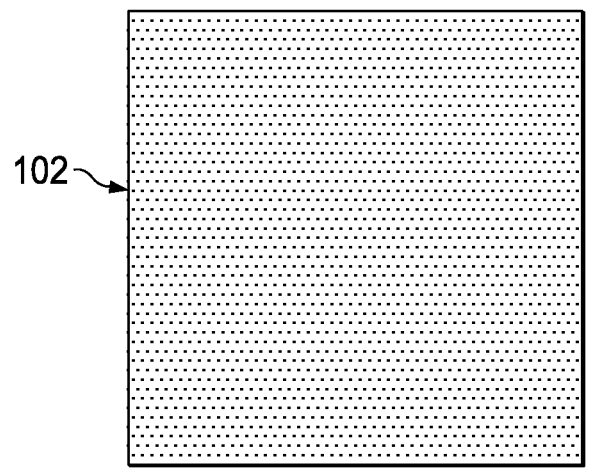
FIG. 1A shows a known DMD image pixel.
Figure 1B:
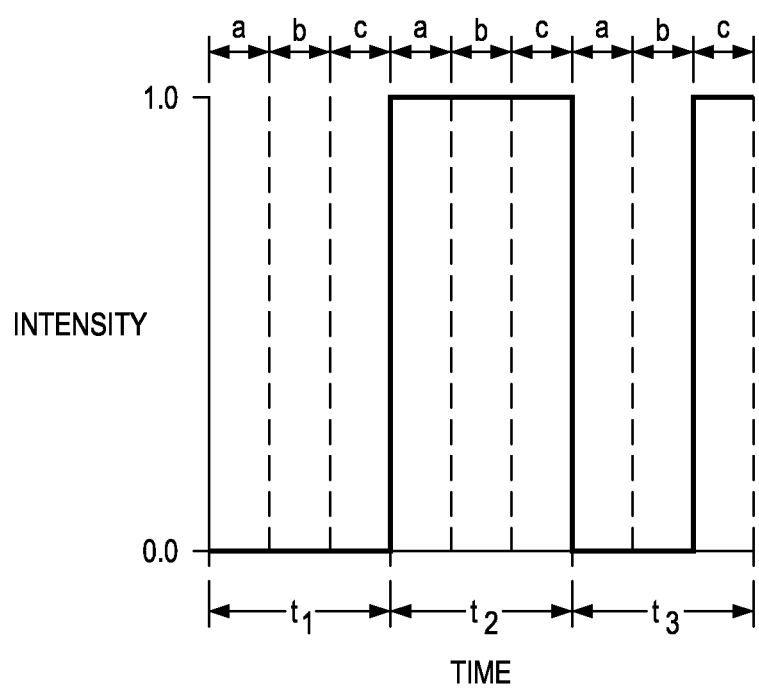
FIG. 1B illustrates time slices and a simplified example of display level intensity achieved by a known DMD device.
Figure 3:
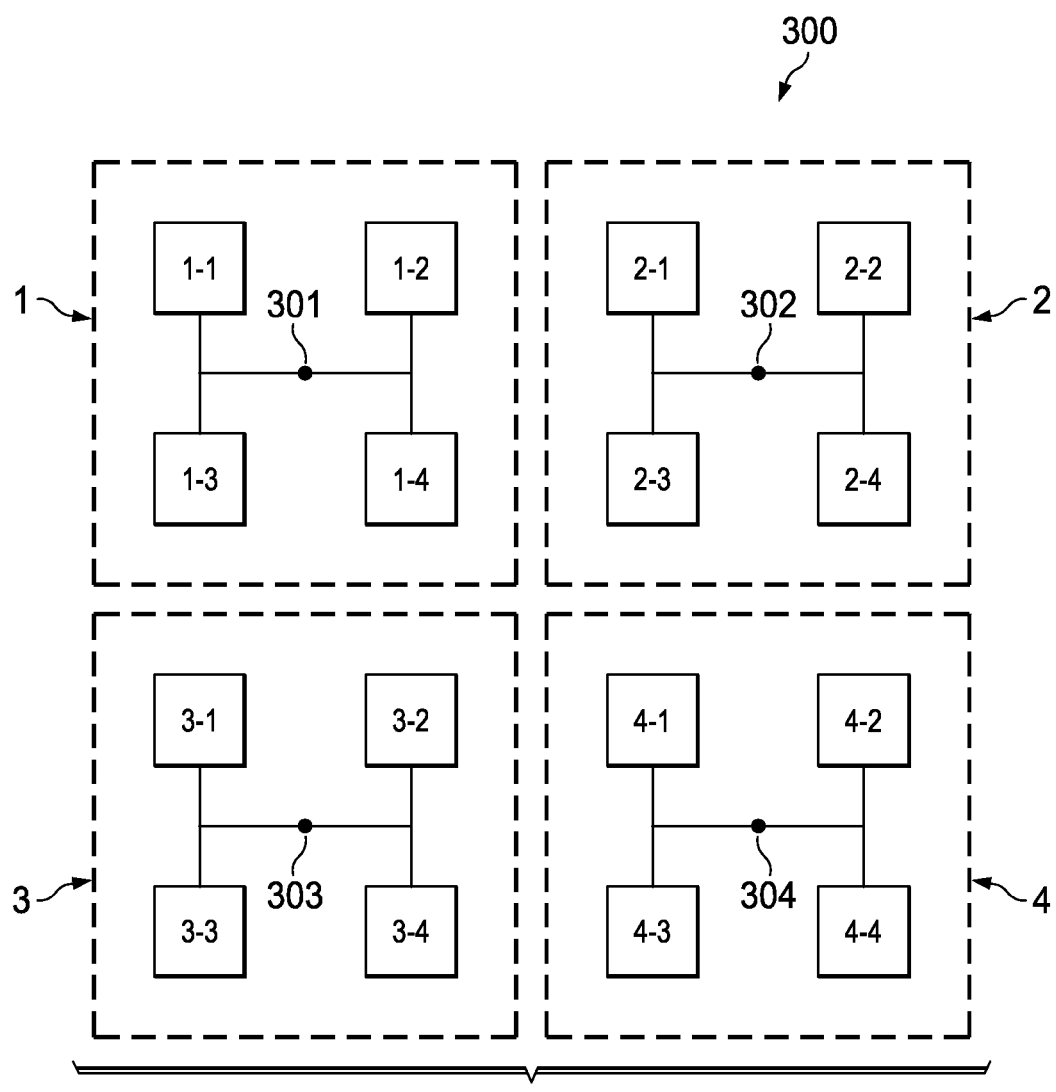
FIG. 3 shows a plan view of a DMD sub-pixel structure, including data lines.

FIG. 3 shows a plan view of a DMD sub-pixel structure. A prior art DMD mirror (see FIG. 1) may comprise a single DMD mirror per image pixel. In contrast, an image pixel according to an illustrative embodiment comprises a plurality of sub-pixels. For clarity, the sub-pixels are scaled smaller than in an actual device. In an actual device, the mirror area substantially fills an image pixel. A portion of a DMD sub-pixel structure 300 is illustrated. DMD sub-pixel structure 300 comprises four image pixels 1, 2, 3, and 4, wherein each image pixel in DMD sub-pixel structure 300 comprises four sub-pixels. For example, image pixel 1, comprises four sub-pixels 1-1, 1-2, 1-3, and 1-4. Therefore, in an illustrative embodiment, an image pixel comprises multiple sub-pixels and each sub-pixel comprises a DMD mirror. Other embodiments may comprise different numbers of sub-pixels.

As shown in FIG. 3, all sub-pixels within an image pixel share the same data line, such as data line 301, 302, 303, and 304, for image pixels 1, 2, 3, 4, respectively. Because the data is loaded concurrently for the sub-pixels, the DMD load time will not increase. For example, image pixel 1 has a single data line connection 301. Data line connection 301 serves sub-pixels 1-1, 1-2, 1-3, and 1-4. Data line connection 303 serves sub-pixels 3-1, 3-2, 3-3, and 3-4. Data line connection 302 serves all of the sub-pixels in image pixel 2 and data line connection 304 serves all of the sub-pixels in image pixel 4. It is an advantage of an illustrative embodiment that the load time may not increase as the intensity resolution increases.

Figure 4:
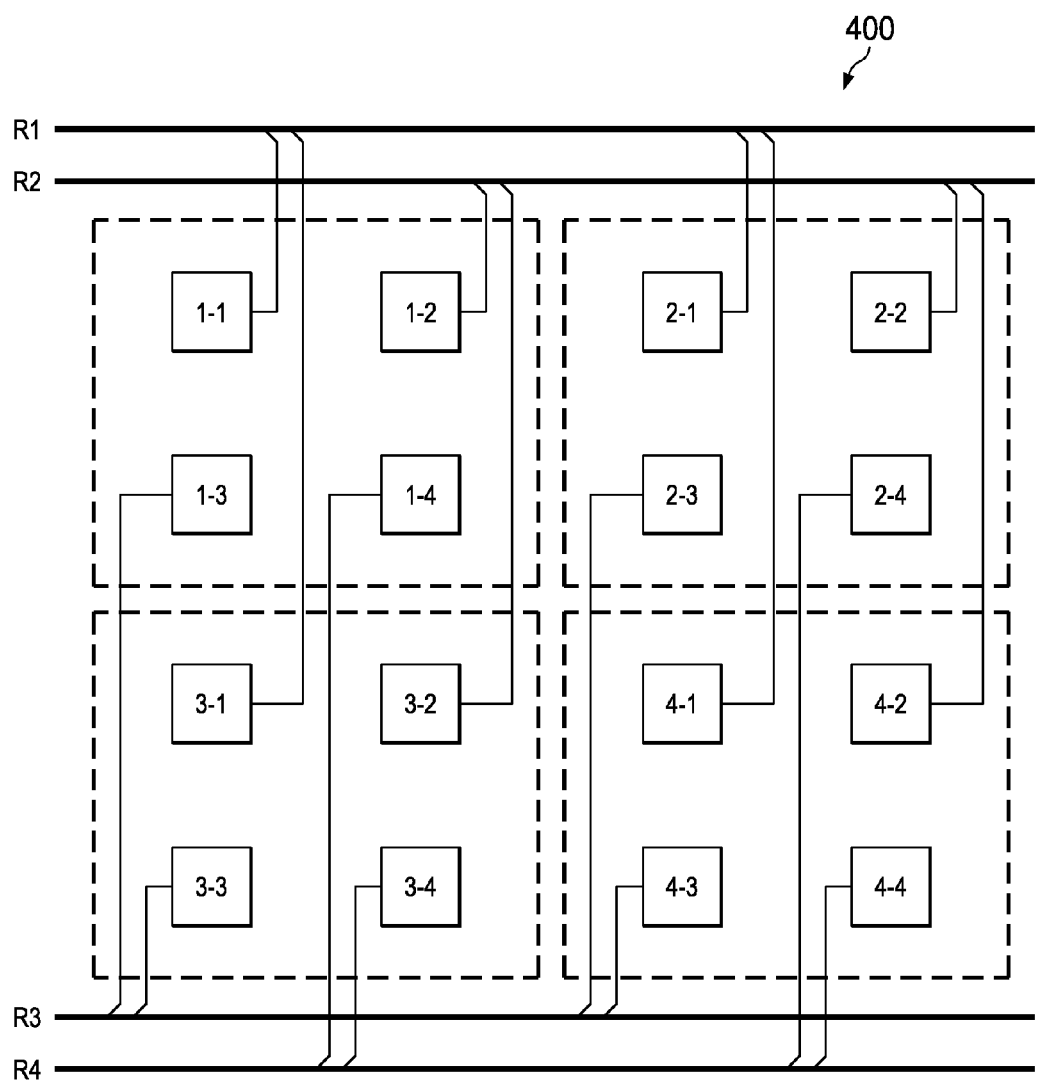
FIG. 4 shows a plan view of a DMD sub-pixel structure, including reset lines.

FIG. 4 shows a plan view of a DMD sub-pixel structure 400, including reset lines. DMD sub-pixel structure 400 may be the same as DMD sub-pixel structure 300, in FIG. 3. However, in FIG. 4, to more clearly show the reset lines, data line connections, such as data line connection 301 in FIG. 3, are not shown. FIG. 4 illustrates that the reset function has independent control of each sub-pixel within an image pixel. For example, consider the four image pixels each containing four subpixels. Reset line RI is connected to sub-pixels 1-1, 2-1, 3-1, and 4-1. Reset line R2 is connected to sub-pixels 1-2, 2-2, 3-2, and 4-2. Reset line R3 is connected to sub-pixels 1-3, 2-3, 3-3, and 4-3, and Reset line R4 is connected to sub-pixels 1-4, 2-4, 3-4, and 4-4. In general, if an image pixel contains m subpixels, where m is a positive integer, reset lines R1 through Rm are connected to a different sub-pixel in each image pixel. Thus during reset, each sub-pixel in an image pixel, such as image pixel 1, may be controlled independently. In other words, sub-pixels 1-1, 1-2, 1-3, and 1-4 may be reset independently.

One benefit of an embodiment is that while data conveying the image pixel is controlled by data lines, which are loaded to all of the sub-pixels in a single image pixel simultaneously, the intensity of the image pixel may be controlled separately through the reset function. Therefore, the response time of an illustrative embodiment may not significantly change as compared to a known system.

FIG. 5 shows a plan view of another DMD sub-pixel structure embodiment, which includes reset decoder 502. In this embodiment, two signals, XR1 and XR2, into the image pixel structure are needed to control all four sub-pixels of each image pixel independently, in contrast to the four signals required in the embodiment illustrated in FIG. 4. In other embodiments, comprising a different number of sub-pixels, the reset decoder provides for a reduced number of signals needed to control each sub-pixel. Therefore, a system with reset decoder 502 may require less communication lines between a processor system, such as processor system 212 of FIG. 2, and the DMD, such as DMD 202 of FIG. 2. A reset signal to each reset group may be provided by a special device external or internal to the DMD.

FIG. 5 shows a plan view of another DMD sub-pixel structure embodiment, which includes reset decoder 502. In this embodiment, two signals, XR1 and XR2, into the image pixel structure are needed as a coded input reset signal (e.g., two-bit encoded signal) to control all four sub-pixel of each image pixel independently, in contrast to the four signal required in the embodiment illustrated in FIG. 4. In other embodiments, comprising a different number of sub-pixels, the reset decoder provides for a reduced number of signals needed to control each sub-pixels. Therefore, a system with reset decoder 502 may require less communication lines between a processor system, such s processor system 212 of FIG. 2, and the DMD, such as DMD 202 of FIG. 2. A rest signal to each reset group may be provided by a special device external or internal to the DMD.

Figure 6A:
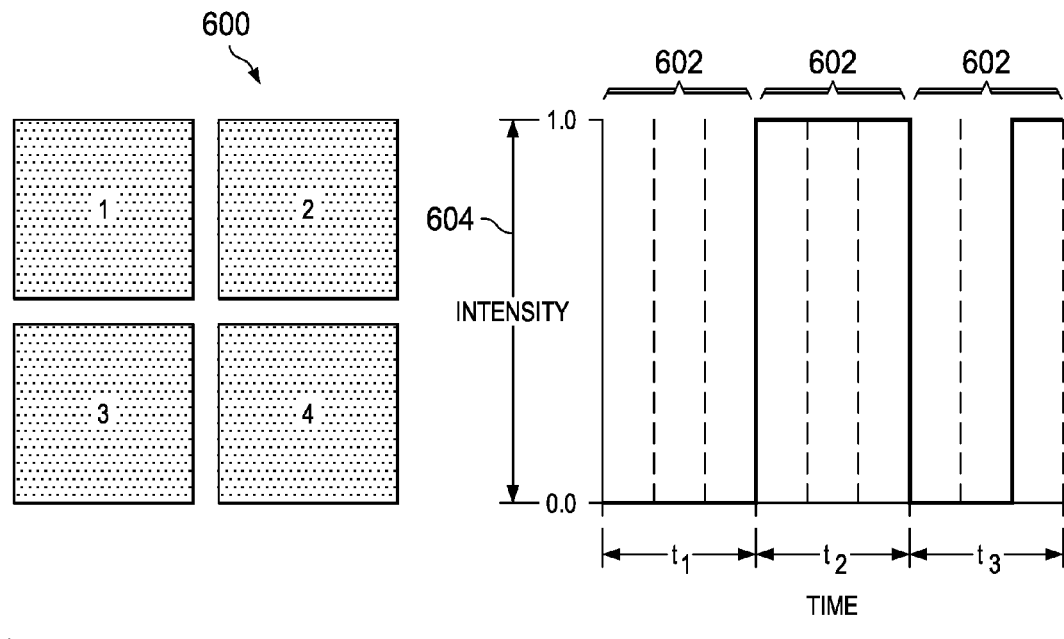
FIGS. 6A-6D illustrate time slices and a simplified example of display level intensity in accordance with an illustrative embodiment.

FIGS. 6A-6D demonstrate simplified examples of display level intensity 604, in accordance with an illustrative embodiment. In this simple example, the intensity resolution n=2 is used, therefore, for an integrated time period $t_p$, $2^n-1$ is equal to three time slices 602. FIG. 6A shows image pixel 600 comprising a sub-pixel set in the DMD device. In FIG. 6A, all four of the sub-pixels 1, 2, 3, and 4 may be turned on, illuminating image pixel 600. Sub-pixels 1, 2, 3, and 4 are configured as shown in FIGS. 3 and 4, wherein each sub-pixel shares a data line and each sub-pixel has a reset line that controls that sub-pixel separately from the other sub-pixels in image pixel 600. However, in FIG. 6A, all of the sub-pixels may be controlled together or each sub-pixel may be controlled separately to the same effect. In time period $t_1$, all four of sub-pixels 1, 2, 3, and 4 of image pixel 600 are OFF. Therefore 0 time slices 602 are illuminated in time period $t_1$, and to the eye, time period $t_1$ is dark. In time period $t_2$, all four of the sub-pixels 1, 2, 3, and 4 are illuminated for 3 out of 3 time slices 602. Therefore, to the eye, time period $t_2$ is at a maximum or 100% bright. In time period $t_3$, all four of the sub-pixel mirrors are dark for two time slices 602 and then illuminated for one time slice 602. Therefore the eye perceives time period $t_3$ as 33% as bright as time period $t_2$.

FIG. 6A, therefore, illustrates the example case of a quad sub-pixel configuration in a whole pixel mode, wherein all sub-pixels in an image pixel are in the same state of ON or OFF. In whole pixel mode, all sub-pixel reset lines convey the same signal to each sub-pixel, whether controlled independently or as a unit. In an embodiment, image pixels, such as image pixel 600, may comprise sub-pixels that are controlled as a unit all, some, or none of the time.

Figure 6B:
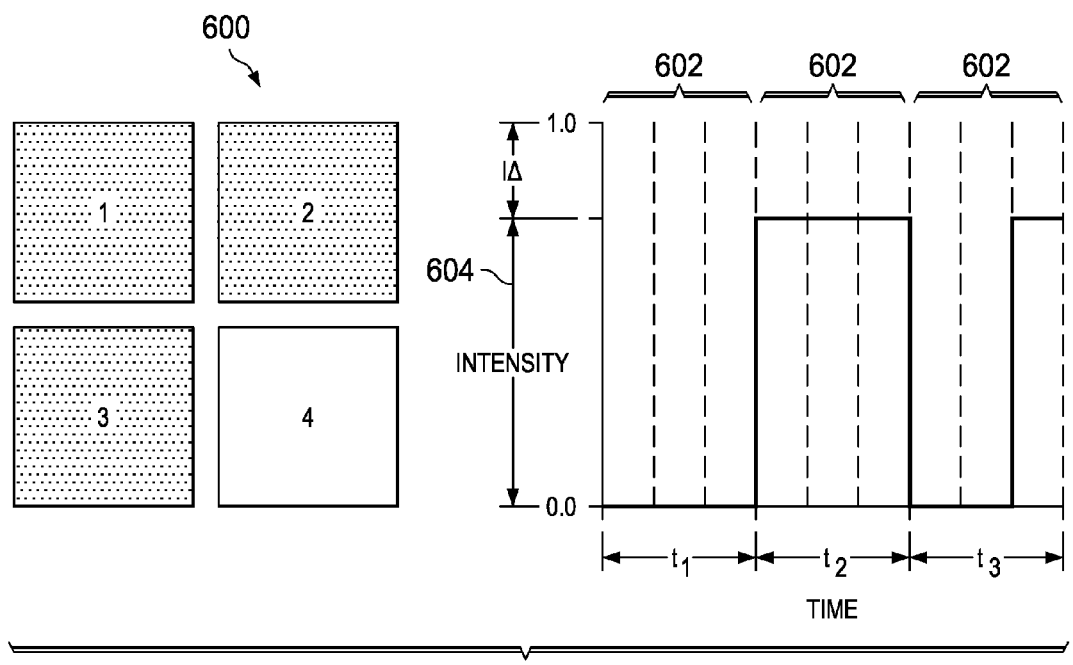

FIG. 6B shows a fractional pixel mode. In fractional pixel mode only a portion of the sub-pixels 1, 2, 3, or 4 in one image pixel are turned on to achieve an increased bit depth. In FIG. 6B, sub-pixel 4 of image pixel 600 is reset to OFF while sub-pixels 1, 2, and 3 are turned ON. The data line for image pixel 600 is connected to all of the sub-pixels in image pixel 600, thus the intensity versus time graph shows that in time period $t_1$ all four of sub-pixels 1, 2, 3, and 4 of image pixel 600 are OFF. Therefore, zero time slices 602 are illuminated for time period $t_1$, and to the eye, time period $t_1$ is dark. In time period $t_2$, sub-pixel 4 is reset and only three of the sub-pixels 1, 2, and 3 are illuminated for 3 out of 3 time slices 602. Therefore, to the eye, time period $t_2$ is ¾ of maximum or 75% as bright as time period $t_2$ in FIG. 6A. Delta I (IΔ) is the difference in intensity from whole pixel mode to this example of fractional pixel mode.

In time period $t_3$, all four of the sub-pixel mirrors are dark for two time slices 602 and then three pixels 1, 2, and 3 are illuminated for one time slice 602. Therefore the eye perceives time period $t_3$ as ¾ or 75% as bright as time period $t_3$ in FIG. 6A.

Figure 6C:
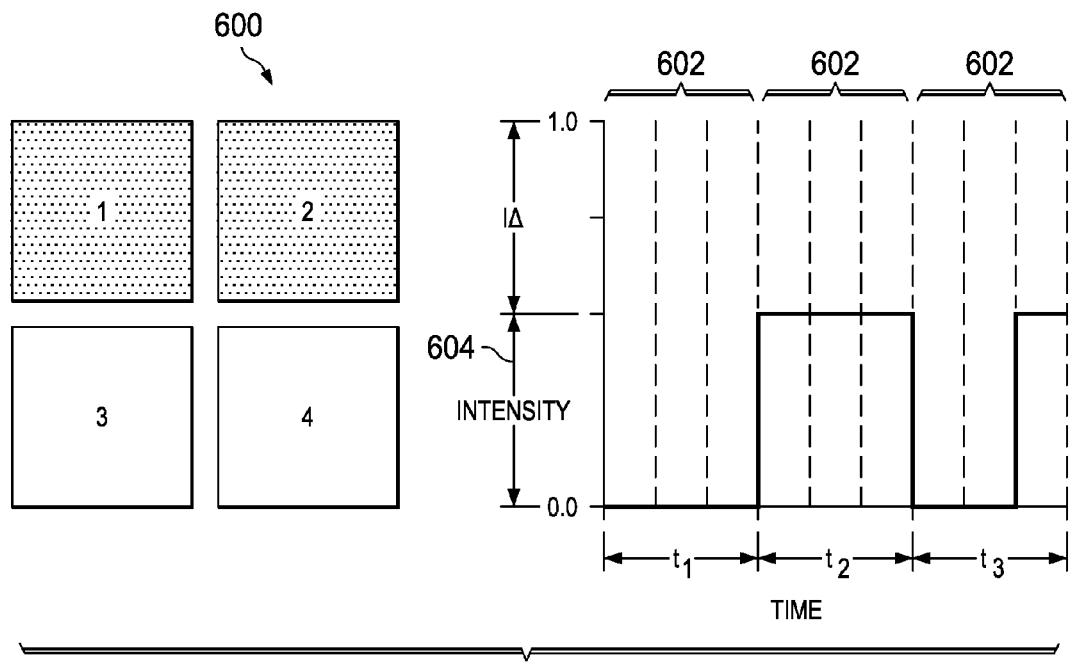

FIG. 6C shows an additional fractional pixel mode. In time period $t_1$, all four of sub-pixels 1, 2, 3, and 4 of image pixel 600 are OFF, therefore zero time slices 602 are illuminated for time period $t_1$. Thus to the eye, time period $t_1$ is dark. In time period $t_2$, two of the sub-pixels 1 and 2 are illuminated for 3 out of 3 time slices 602, therefore, to the eye, time period $t_2$ is ½ as bright as $t_2$ in FIG. 6A. In time period $t_3$, all four of the sub-pixel mirrors are dark for two time slices 602 and then two sub-pixels are illuminated for one time slice 602. The eye integrates the light in time period $t_3$ over the entire time period $t_3$ and thus, perceives time period $t_3$ as ½ as bright as time period $t_3$ in FIG. 6A.

Figure 6D:
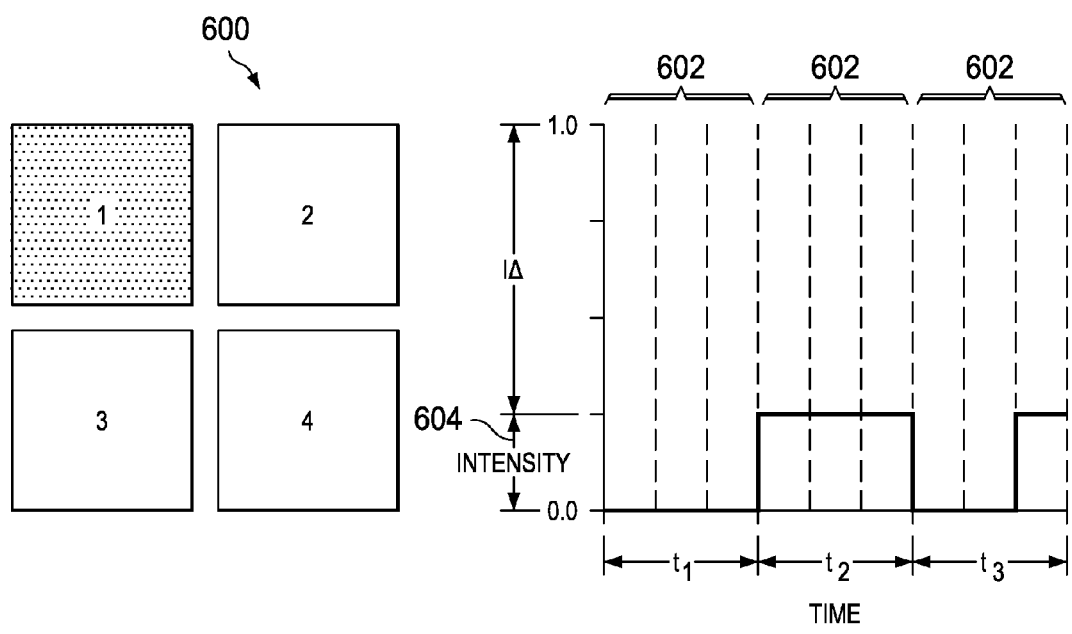

Lastly, FIG. 6D illustrates another fractional pixel mode. In time period $t_1$, all four of sub-pixels 1, 2, 3, and 4 of DMD image pixel 600 are OFF, therefore zero time slices 602 are illuminated for time period $t_1$. Thus, time period $t_1$ is dark. In time period $t_2$, one of the sub-pixels 1 is illuminated for 3 out of 3 time slices 602. Therefore, to the eye, time period $t_2$ is at ¼ as bright as $t_2$ in FIG. 6A. In time period $t_3$, all four of the sub-pixel mirrors are dark for two time slices 602 and then one pixel is illuminated for one time slice 602. Therefore the eye integrates the light in time period $t_3$ over the entire time period $t_3$ and thus, perceives time period $t_3$ as ¼ as bright as time period $t_3$ in FIG. 6A.

Figure 7:
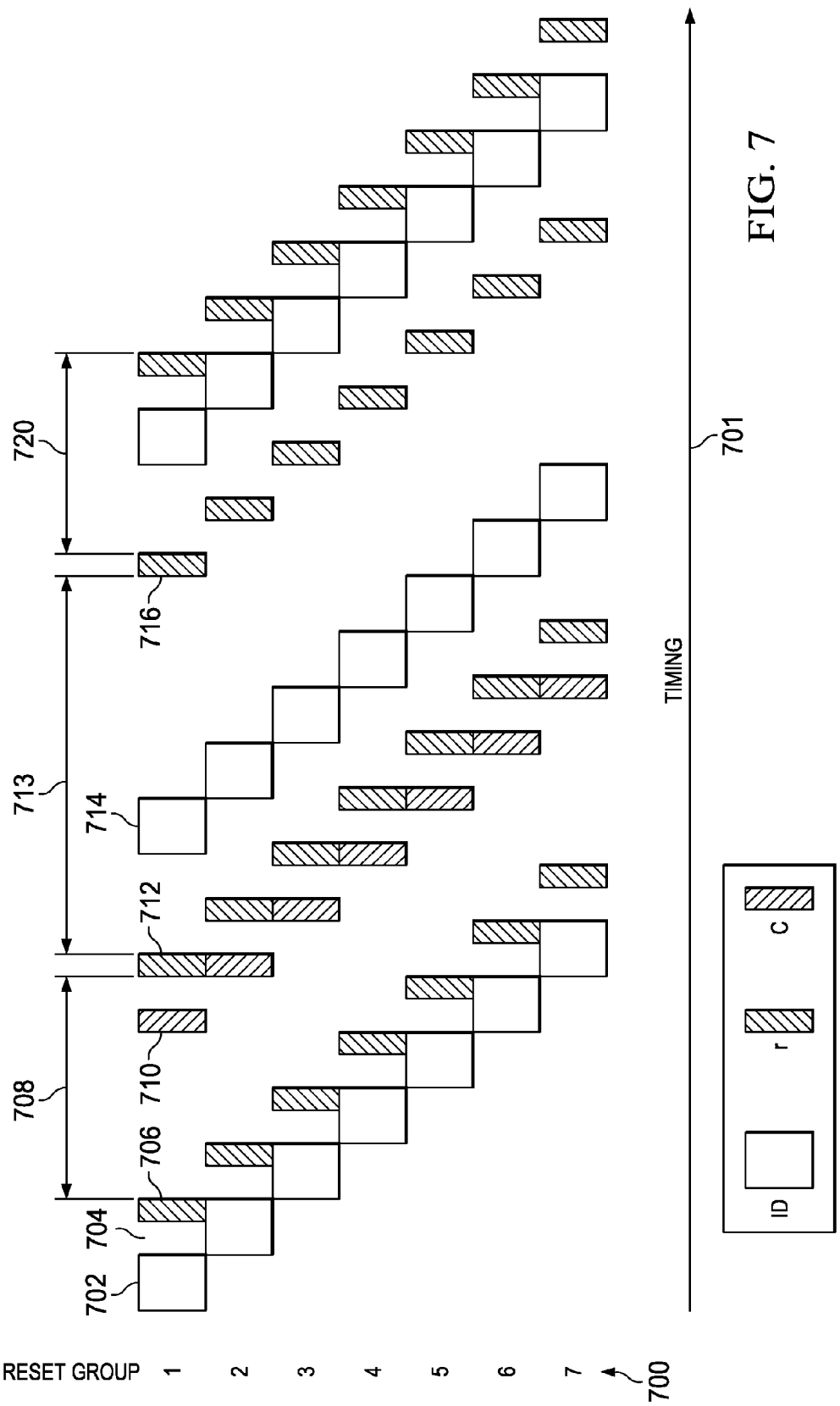
FIG. 7 shows a timing sequence wherein a fractional pixel bit immediately follows a fast clear bit.

To operate a sub-pixel DMD device in fractional pixel mode, all mirrors generally are in an OFF state prior to the display of any of the sub-pixels. In some operational cases, this will not cause any additional processing. For example, FIG. 7 shows a time sequence for a phased reset system wherein a fractional pixel bit immediately follows a fast clear bit. A fast clear bit may be applied to a DMD device to clear the bit prior to the occurrence of a reset, thus bypassing the need to perform a load operation. Since the fast clear bit turns all of the mirrors OFF in the reset group, the DMD device will be in a ready state for a fractional pixel mode. Thus, no additional processing is necessary.

FIG. 7 shows seven reset groups 700 in rows on a timing axis 701. A load (ID) 702 is followed by a data setup time 704 (blank space), then a reset (r) 706. Following reset 706, the loaded data is displayed in time period 708. In this timing sequence, a mirror clear (c) 710 operation clears, i.e., sets memory content to 0 for the prior bit that was loaded at ID 702 for all mirrors in reset group 1. All of the mirrors in reset group 1 are then turned OFF at the next reset 712, and reset group 1 is dark for time period 713. Fractional pixel mode data then may be loaded in load (ID) 714, implemented by reset 716, and thus fractional pixel mode is displayed in time period 720. As is apparent from FIG. 7, other reset groups follow the same timing. Timing constraints are described in U.S. Patent Publication 2005/0184938, and therefore will not be discussed in detail herein. However, note that load functions may not be concurrent for different reset groups. Further note that no change in mirror position occurs until a reset is implemented.

Figure 8:
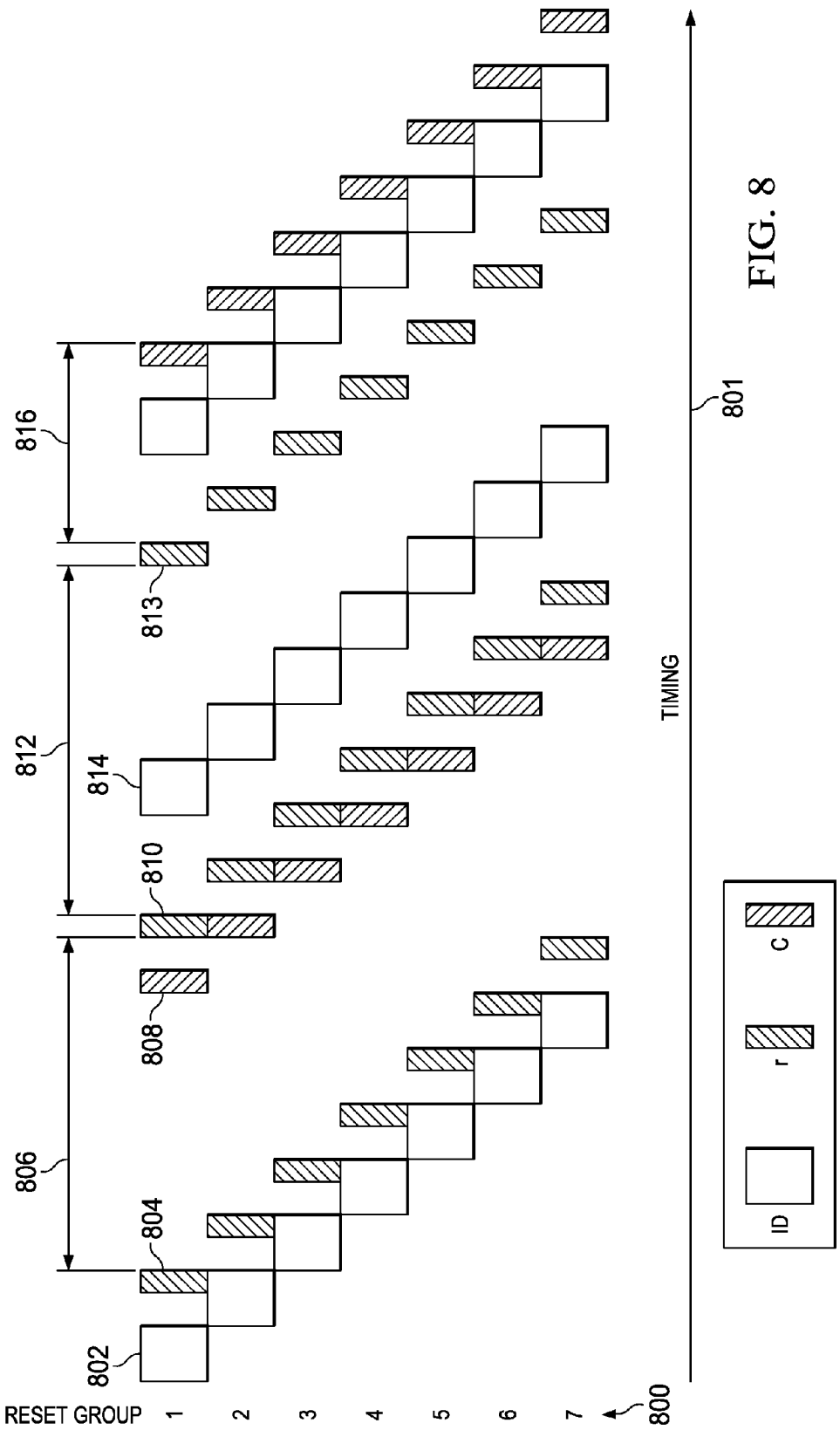
FIG. 8 shows a timing sequence wherein a fractional pixel bit immediately follows a normal bit.

FIG. 8 shows a timing sequence wherein a fractional pixel bit immediately follows a normal bit. In this case, a mirror clear operation generally is performed so that all mirrors will be in OFF state following the normal bit in order to next display the fractional pixel bit. The clear operation, which has a function similar to a fast clear bit, may be done in each reset group. Turning to FIG. 8 and looking at reset group 1, a normal bit is loaded in load (ID) 802 and is implemented by reset 804. The normal bit is then displayed during time period 806. A mirror clear operation for all mirrors in reset group 1 is conducted during 808. Therefore, at reset 810 all of group 1 mirrors are turned OFF and are dark for time period 812. A fractional pixel mode may then be loaded in load (ID) 814, implemented at reset 813 and displayed during time period 816. Thus, in the case of a fractional pixel bit following a normal bit, clear operations are added into the sequencing and the dark time period 812 is the same length as the dark time period 713 in FIG. 7.

Figure 9:
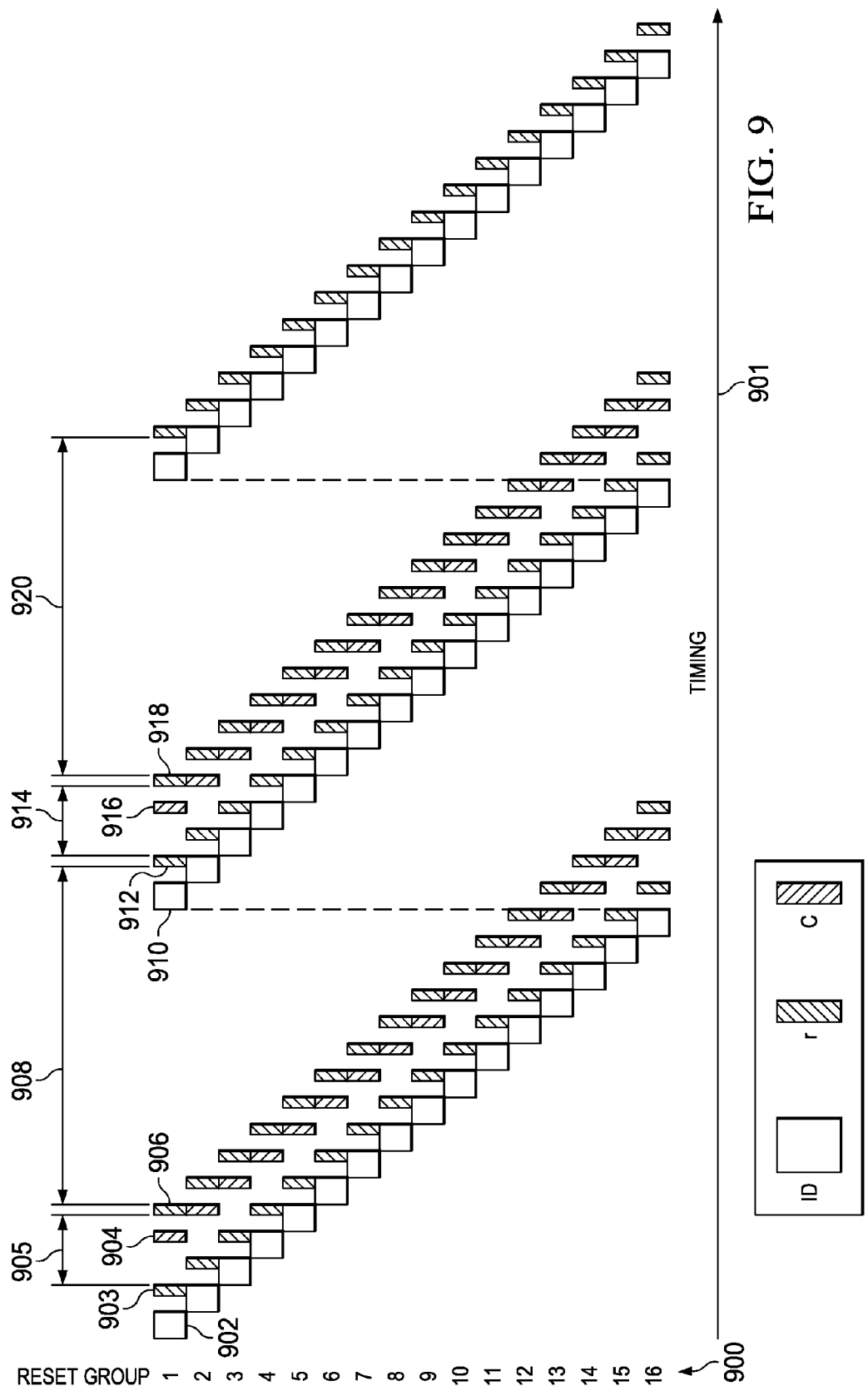
FIG. 9 shows a timing sequence wherein a fractional pixel bit immediately follows a fast clear bit and the sub-pixel bit is also a fast clear bit.

FIG. 9 shows a timing sequence wherein a fractional pixel bit immediately follows a fast clear bit and the fractional pixel bit itself is also a fast clear bit. The bit loaded in load (ID) 902 is implemented by reset 903 and displayed during time period 905. The bit loaded in load (ID) 902 is cleared by clear 904. The clear bit is implemented by reset 906 and the resulting dark time is displayed during time period 908. A fractional pixel bit is loaded in load (ID) 910 and implemented at reset 912. The fractional pixel bit is displayed during time period 914. A group 1 clear operation is done by clear 916 and implemented at reset 918, with the resulting dark time during time period 920. In this case, more bit depth is achieved at the expense of more dark time. In other words, more levels of light intensity may be presented with the additional dark time.

Figure 10:
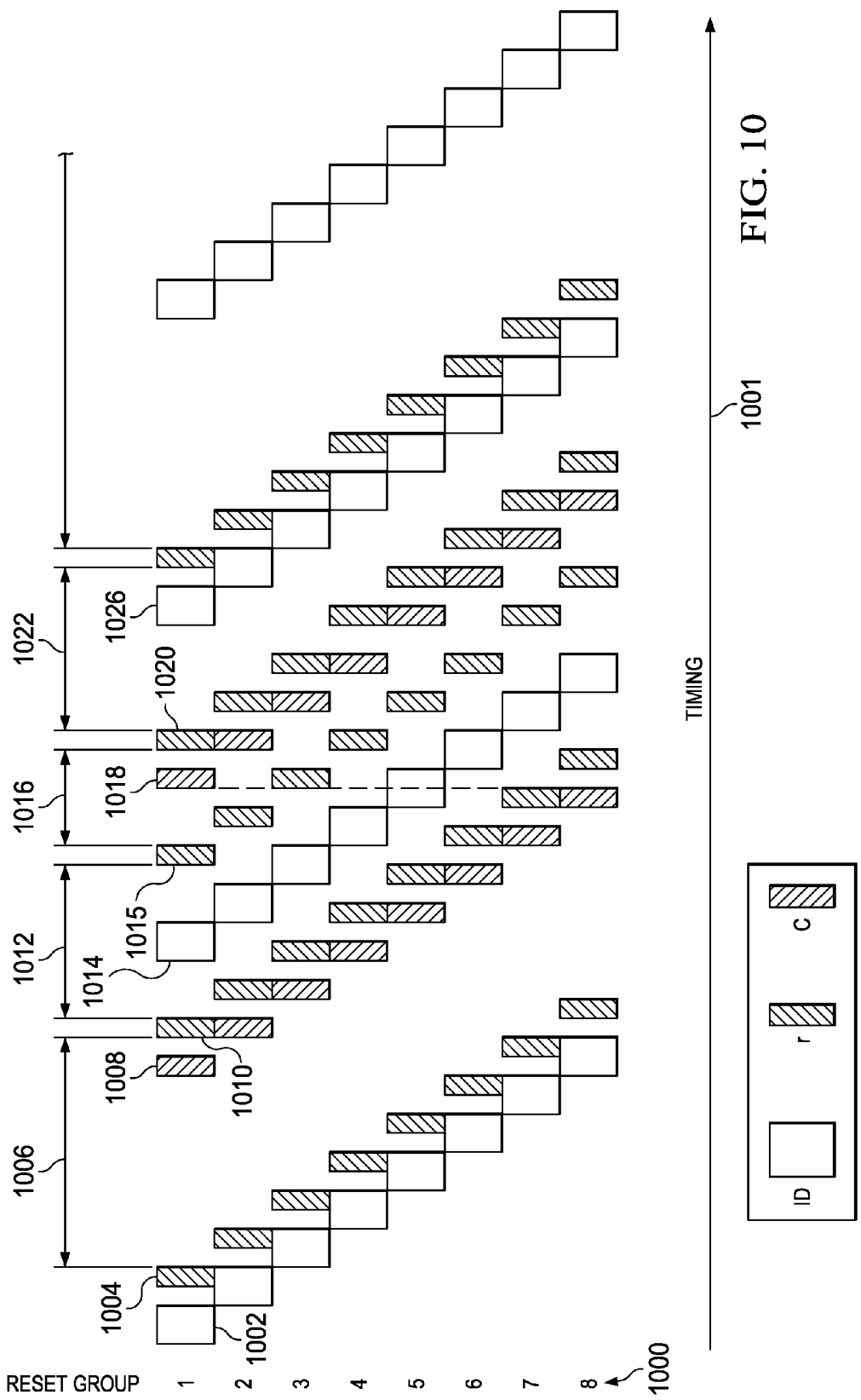
FIG. 10 shows a timing sequence wherein a fractional pixel bit immediately follows a normal bit, and the sub-pixel is a fast clear bit.

FIG. 10 shows a time sequence wherein a fractional pixel bit immediately follows a normal bit, and the fractional pixel bit itself is a fast clear bit. A normal bit is loaded in load (ID) 1002, implemented by reset 1004, and displayed during time period 1006. The normal bit is terminated by clear operation 1008. Thus, upon reset 1010, reset group 1 is OFF and time period 1012 is a dark time. Fractional pixel bit is loaded in load (ID) 1014, implemented at reset 1015, and displayed during time period 1016. The fractional pixel bit is terminated by a clear operation 1018. Thus, upon reset 1020, reset group 1 is turned OFF and time period 1022 is a dark time. A normal bit may be loaded in load (ID) 1026 for further processing. The scenario depicted in FIG. 10 also enhances bit depth at the expense of more dark time.

Although the illustrative embodiments and their advantages have been described in detail, it should be understood that various changes, substitutions, and alterations can be made herein without departing from the spirit and scope of the invention as defined by the appended claims. For example, many of the features and functions discussed above can be implemented in software, hardware, or firmware, or a combination thereof. As another example, it will be readily understood by those skilled in the art that the number of sub-pixels in an image pixel may be varied while remaining within the scope of the present invention.

Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A semiconductor device comprising:
    at least one reset decoder providing a plurality of coded reset signal on a plurality of reset signal lines;
    an array of individually controllable image pixels arranged in a plurality of reset groups, the image pixels of each reset group connected for receipt of a same one of the plurality of coded reset signals, each image pixel comprising a plurality of different sub-pixels arranged in a plurality of rows and columns so as to fit within the image pixel, and
    each sub-pixel comprising a different position-settable micromirror element; and
    an array of memory cells, wherein each of the images pixels has one-to-one correspondence with one of the memory cells in the array of memory cells;
    wherein
    all sub-pixels of each respective image pixel are coupled to a common data line for concurrent receipt of a same image pixel data signal from the respective corresponding one of the memory cells; and wherein
    each sub-pixel of each respective image pixel is coupled to a different one of the plurality of reset signal lines for independent receipt of different ones of the plurality of coded reset signals to enable at least selective concurrent individual loading of same image pixel data to all of the sub-pixels at a first time, and selective concurrent individual loading of same image pixel data to fewer than all of the sub-pixel at a second time, according to a decoding by the at least one reset decoder.

2. The semiconductor device of claim 1, wherein the selective individual loading of settings comprises the selective individual loading of an ON/OFF state of each sub-pixel in each image pixel.

3. The semiconductor device of claim 1, wherein each sub-pixel set comprises four sub-pixels.

4. The semiconductor device of claim 3, wherein the four sub-pixels is a 2×2 array arrangement of adjacent sub-pixels.

5. The semiconductor device of claim 1, wherein the at least one reset decoder comprises a reset decoder associated with each image pixel; and wherein loading of the image pixel data to all or fewer than all of the sub-pixels is enabled according to a decoding of a received coded reset signal by the reset decoder associated with the respective image pixel.

6. A semiconductor device comprising:
    a spatial light modulator including a multiplicity of individually addressable micromirrors, each micromirror defining an image sub-pixel, each set of n×n adjacent different micromirrors defining an image pixel, and pluralities of different ones of the image pixels defining reset groups;
    at least one reset decoder having a reset line output associated with each reset group;
    the micromirors that define the sub-pixels of each respective image pixel being all coupled to a common data line for concurrent receipt of same "ON" or "OFF" positioning setting data, and being separately coupled to a different one of the reset line outputs of the at least one reset decoder for individual control of the concurrent application of the same "ON" or "OFF" position selectively to all of the micromirrors at a first time, and individual control of the concurrent application of the same "ON" or "OFF" positions selectively to fewer than all of the micromirrors at a second time, according to a decoding by the at least one reset decoder, to vary the intensity setting for light reflected by the image pixels by selectively applying reset signals to different ones of the reset line outputs.

7. The semiconductor device of claim 6, wherein the image pixels are defined by an n ×n array of at least 2×2 adjacent micromirrors.

8. The semiconductor device of claim 6, wherein the at least one reset decoder comprises a reset decoder associated with each image pixel; and wherein the concurrent application of the same "ON" or "OFF" positions selectively to all or fewer than all of the micromirrors is controlled according to a decoding of a received coded reset signal by the reset decoder associated with the respective image pixel.

* * * * *